US008588537B2

(12) United States Patent
Voutilainen et al.

(10) Patent No.: US 8,588,537 B2
(45) Date of Patent: Nov. 19, 2013

(54) METHODS, APPARATUSES AND COMPUTER PROGRAM PRODUCTS FOR UTILIZING WIRELESS LINKS FOR COMMUNICATION OF COMPRESSED DATA

(75) Inventors: Martti Kalevi Voutilainen, Espoo (FI); Sergey Balandin, Helsinki (FI)

(73) Assignee: Nokia Corporation, Espoo (FI)

( * ) Notice: Subject to any disclaimer, the term of this patent is extended or adjusted under 35 U.S.C. 154(b) by 283 days.

(21) Appl. No.: 13/170,737

(22) Filed: Jun. 28, 2011

(65) Prior Publication Data

US 2013/0004091 A1 Jan. 3, 2013

(51) Int. Cl.
*G06K 9/36* (2006.01)

(52) U.S. Cl.
USPC .......................................................... 382/232

(58) Field of Classification Search
USPC ........................... 382/232, 233, 240, 270, 275
See application file for complete search history.

(56) References Cited

U.S. PATENT DOCUMENTS 6,141,453 A * 10/2000 Banham et al. ............... 382/240
2011/0161514 A1 6/2011 Voutilainen et al.

OTHER PUBLICATIONS

Balandin, Sergey, et al., "Embedded Network Architectures for Mobile Devices," *ESA, 9th Spacewire WG Seminar in EDAS*, Apr. 27, 2007, Abstract, 1 page, accessed on Jan. 30, 2013, <http://research.nokia.com/publication/5596>.
Wikimedia Foundation Inc., "UniPro," *Wikipedia, The Free Encyclopedia*, 7 pages, date last updated Dec. 5, 2012, accessed on Jan. 30, 2013, <http://en.wikipedia.org/wiki/UniPro>.
MIPI Alliance, Inc., "UniPro(R) Specifications," 5 pages, accessed on Jan. 30, 2013, <http://www.mipi.org/specifications/unipro-specifications>.
Candés, Emamnuel J., "Compressive Sampling," *Proceedings of the International Congress of Mathematicians*, Aug. 22-30, 2006, Madrid, Spain, 20 pages, California Institute of Technology, USA.
Romberg, Justin, "Imaging Via Compressive Sampling," *IEEE Signal Processing Magazine*, Mar. 2008, vol. 14, IEEE, USA.
Malioutov, Dmitry M., et al, "Sequential Compressed Sensing," 11 pages, accessed Jan. 30, 2013, <http://arxiv.org/abs/1003.0219v1>.
Baraniuk, Richard G., "Lecture Notes: Compressive Sensing," *IEEE Signal Processing Magazine*, Jul. 2007, 4 pages, IEEE, USA.
Drori, Iddo, "Compressed Video Sensing," *Notes from the British Machine Vision Association and Society for Pattern Recognition (BMVA) Symposium on 3D Video—Analysis, Display and Applications*, Feb. 6, 2006, accessed on Jan. 30, 2013, <citeseerx.ist.psu.edu/viewdoc/download?doi=10.1.1.112.3401>.
Balandin, Sergey, et al., "Embedded Networks in Mobile Devices," *22 International Journal of Embedded and Real-Time Communication Systems*, Jan.-Mar. 2010, pp. 22-36, vol. 1, Issue 1, IGI Global, USA.

* cited by examiner

*Primary Examiner* — Duy M Dang
(74) *Attorney, Agent, or Firm* — Alston & Bird LLP

(57) ABSTRACT

An apparatus for compressing data and optimizing transfer of the compressed data via a wireless link(s) may include a processor and memory storing executable computer code causing the apparatus to at least perform operations including compressing one or more samples of data corresponding to at least one image based in part on generating a plurality of wavelet coefficients. The wavelet coefficients correspond to the sampled data. The computer program code may further cause the apparatus to generate one or more messages including at least one of the wavelet coefficients. Each of the messages may include content denoting that one or more detected errors below a predetermined threshold are insufficient to inhibit reconstruction of the image. The computer program code may further cause the apparatus to enable transmission of the messages to a device(s) via at least one wireless link. Corresponding methods and computer program products are also provided.

20 Claims, 5 Drawing Sheets

METHODS, APPARATUSES AND COMPUTER PROGRAM PRODUCTS FOR UTILIZING WIRELESS LINKS FOR COMMUNICATION OF COMPRESSED DATA

TECHNOLOGICAL FIELD

Example embodiments of the present invention relates generally to data compression and more particularly, relates to a method, apparatus and computer program product for optimizing transfer of compressed data via one or more wireless links.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to compressed data.

Currently, compression of data may require significant computation resources. However, mobile devices typically have only limited amount of battery energy available to perform compression of data. As a consequence, energy-efficient compression methods that require minimal computing power and generate highly compressed images may be beneficial to conserve computational resources of mobile devices. At present, oftentimes the Nyquist sampling frequency may be used to compress multimedia content. However, the Nyquist sampling frequency generally densely samples data which may require sampling over large amounts of data (e.g., sampling every pixel of an image) for reconstruction or decompression of original data. Dense sampling typically consumes a large amount of computing resources, which may constrain resources of mobile devices.

As such, it may be more efficient to provide a mechanism of performing sampling and storing of compressed content utilizing information that allows practically all compressed data to be reconstructed from much smaller amounts of sampled information than what the Nyquist sampling frequency and other conventional compression methods typically require.

In view of the foregoing drawbacks, it may be beneficial to provide an efficient and reliable mechanism to compress and decompress data which may conserve computational resources of a communication device.

BRIEF SUMMARY

A method, apparatus and computer program product are therefore provided for providing an efficient and reliable mechanism of compressing data. In this regard, an example embodiment may optimize an amount of compressed data transferred via one or more wireless links. The compressed data may include, but is not limited to, one or more images (e.g., pictures, photographs (also referred to herein as photo(s) (e.g., digital photo)), audio data (e.g., music), video data (e.g., one or more videos, video clips) and any other suitable data.

Some example embodiment may utilize compressed sampling (also referred to herein as compressed sensing) compress data and may include a reliability bit (e.g., a reliability flag bit) in the compressed data. The reliability bit may indicate that a state of a wireless link for transfer of the compressed data is switched to unreliable state. Additionally, the reliability bit may indicate or denote that one or more detected errors associated with the compressed data is insufficient to inhibit reconstruction of a compressed image or at least a corresponding portion of the compressed image.

Some example embodiments may enable transmission of the compressed data over a wireless link(s) (e.g., a UniPro$^{SM}$ wireless link) splitting data into several messages (e.g., UniPro$^{SM}$ messages) and enabling reconstruct of a compressed image by graphics processor unit (GPU) accessing information (e.g., one or more corresponding wavelet coefficients) of the compressed image via the wireless link(s).

By splitting data into the several messages, some of the example embodiments may enable recovery of a compressed image with acceptable quality even in instances in which parts of the transmitted messages are lost.

In one example embodiment, a method for compressing data and optimizing transfer of the compressed data via one or more wireless links is provided. The method may include compressing one or more samples of data corresponding to at least one image based in part on generating a plurality of wavelet coefficients corresponding to the sampled data. The method may further include generating one or more messages including at least one of the wavelet coefficients. Each of the messages may include content denoting that one or more detected errors below a predetermined threshold are insufficient to inhibit reconstruction of the image. The method may further include enabling transmission of the messages to at least one device via at least one wireless link.

In another example embodiment, an apparatus for compressing data and optimizing transfer of the compressed data via one or more wireless links is provided. The apparatus may include a processor and a memory including computer program code. The memory and the computer program code are configured to, with the processor, cause the apparatus to at least perform operations including compressing one or more samples of data corresponding to at least one image based in part on generating a plurality of wavelet coefficients corresponding to the sampled data. The computer program code may further cause the apparatus to generate one or more messages including at least one of the wavelet coefficients. Each of the messages may include content denoting that one or more detected errors below a predetermined threshold are insufficient to inhibit reconstruction of the image. The computer program code may further cause the apparatus to enable transmission of the messages to at least one device via at least one wireless link.

In another example embodiment, a computer program product for compressing data and optimizing transfer of the compressed data via one or more wireless links is provided. The computer program product includes at least one computer-readable storage medium having computer-executable program code portions stored therein. The computer-executable program code instructions may include program code instructions configured to compress one or more samples of data corresponding to at least one image based in part on generating a plurality of wavelet coefficients corresponding to the sampled data. The program code instructions may also be configured to generate one or more messages including at least one of the wavelet coefficients. Each of the messages may include content denoting that one or more detected errors below a predetermined threshold are insufficient to inhibit reconstruction of the image. The program code instructions may also be configured to enable transmission of the messages to at least one device via at least one wireless link.

Some example embodiments may provide a better user experience by facilitating transfer or compressed data via one or more wireless links in an efficient and reliable manner. As such, users may enjoy improved capabilities with respect to resources of communication devices being conserved, which may enable the communication devices to operate or function more efficiently.

BRIEF DESCRIPTION OF THE SEVERAL VIEWS OF THE DRAWINGS

Figure 1:
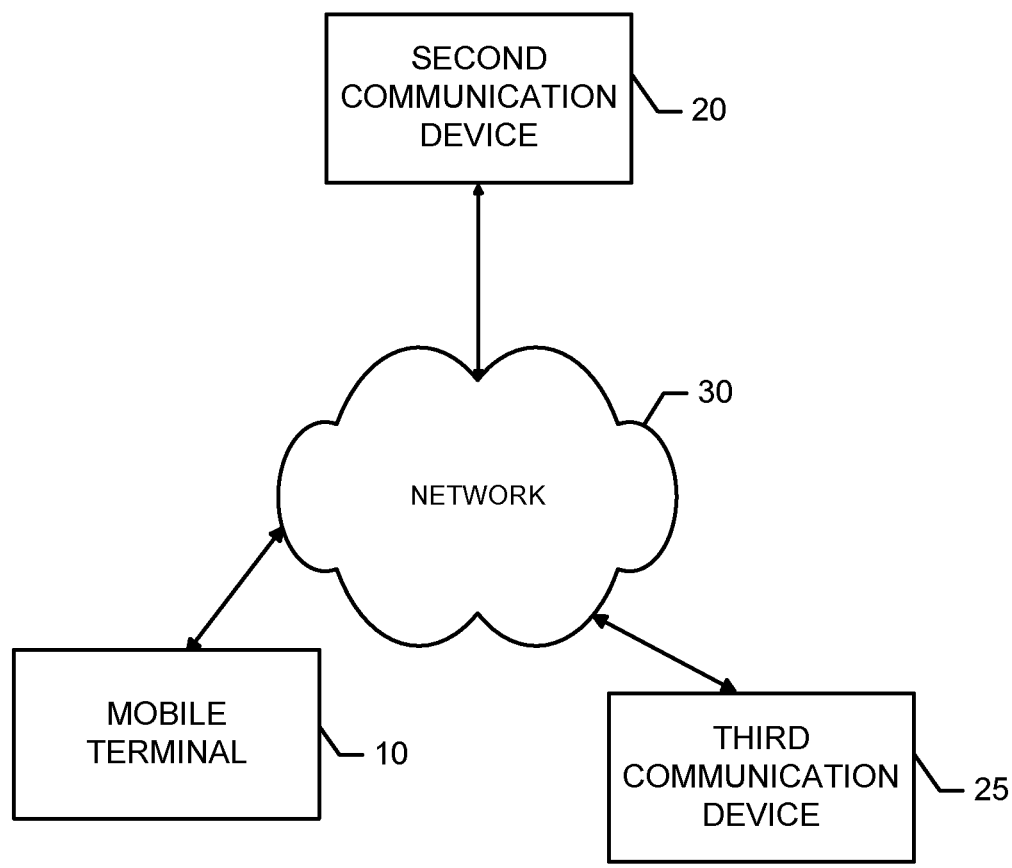
Figure 2:
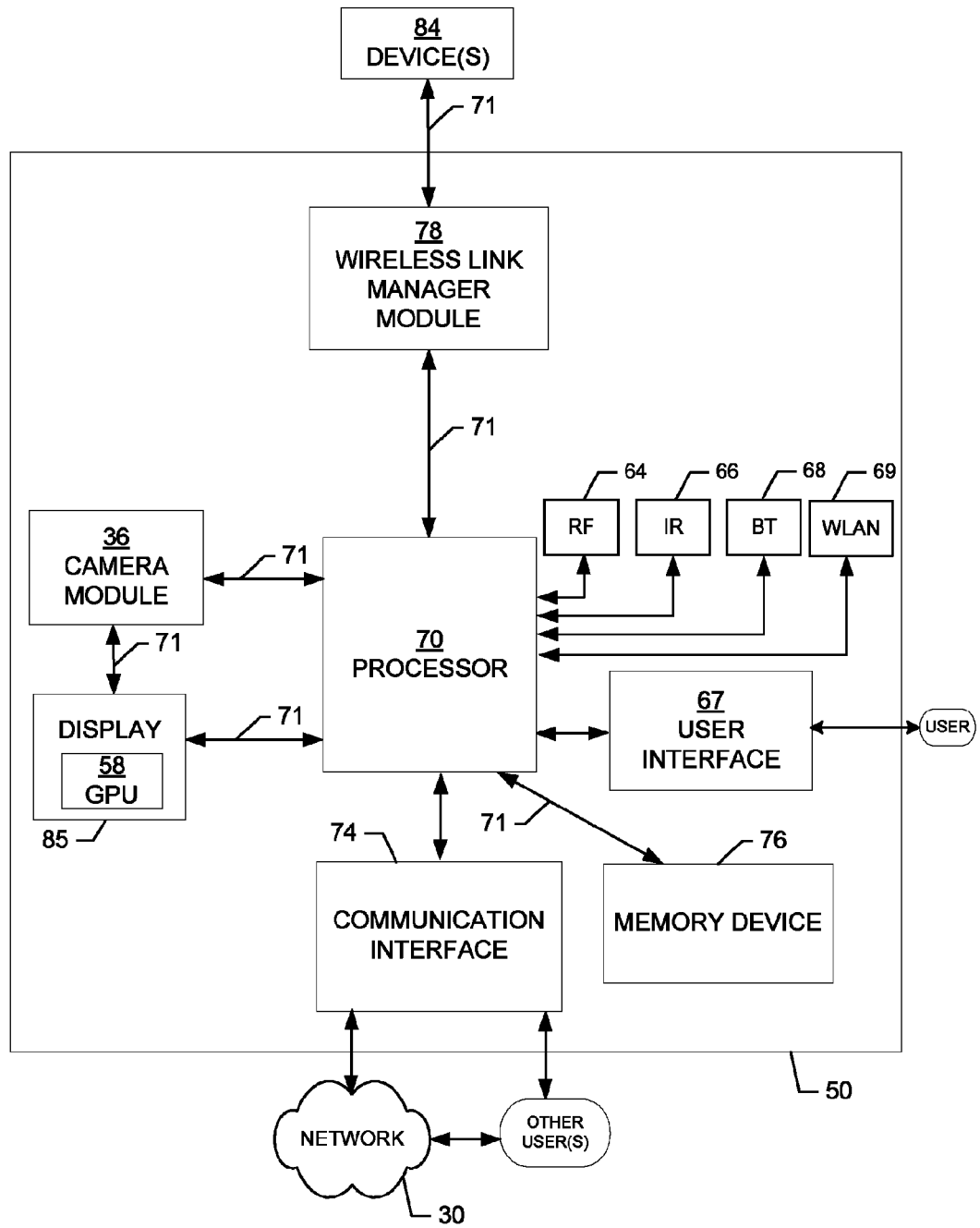
Figure 3:
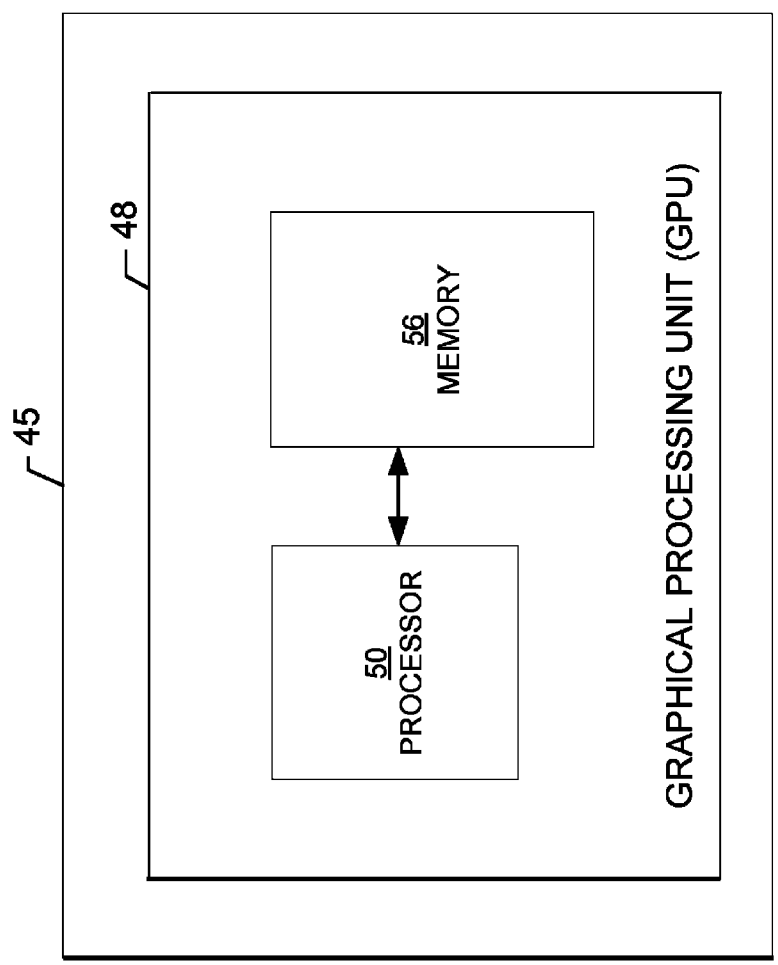
Figure 4:
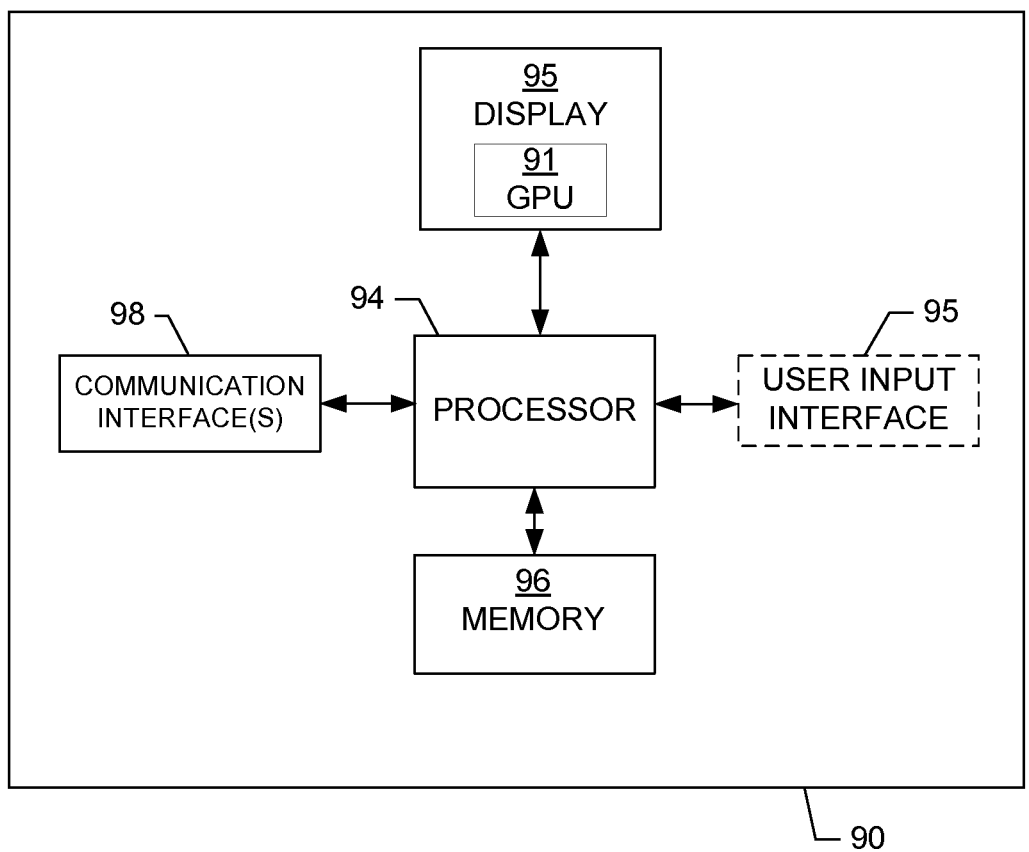
Figure 5:
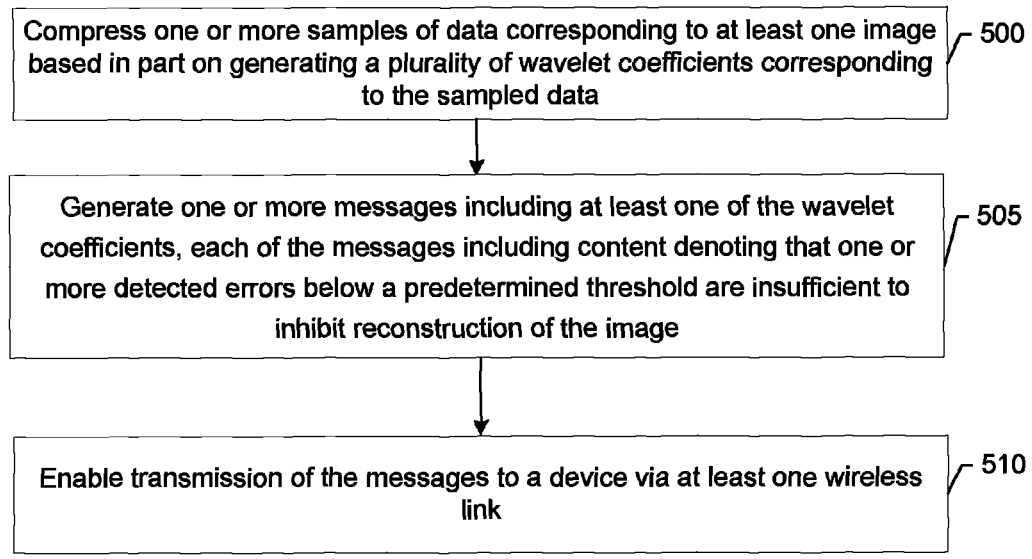

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention;

FIG. 3 is a schematic block diagram of a display according to an example embodiment of the invention;

FIG. 4 is a schematic block diagram of a device according to an example embodiment of the invention; and FIG. 5 illustrates a flowchart for facilitating communications of compressed data via one or more wireless links according to an example embodiment of the invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (for example, volatile or non-volatile memory device), may be differentiated from a "computer-readable transmission medium," which refers to an electromagnetic signal.

FIG. 1 illustrates a generic system diagram in which a device such as a mobile terminal 10 is shown in a communication environment according to some example embodiments. As shown in FIG. 1, a system in accordance with some example embodiments may include a first communication device (for example, mobile terminal 10) and a second communication device 20 capable of communication with each other via a network 30. In some cases, embodiments of the present invention may further include one or more additional communication devices, one of which is depicted in FIG. 1 as a third communication device 25. In some embodiments, not all systems that employ an embodiment of the present invention may comprise all the devices illustrated and/or described herein. While example embodiments of the mobile terminal 10 and/or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) and/or Global Navigation Satellite System (GLONASS) devices, Bluetooth headsets, Universal Serial Bus (USB) devices or any combination of the aforementioned, and other types of voice and text communications systems, can readily employ embodiments of the present invention. Furthermore, devices that are not mobile, such as servers and personal computers may also readily employ embodiments of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. According to some example embodiments the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. According to some example embodiments, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Wi-Fi Network, a Metropolitan Area Network (MAN), and/or a Wide Area Network (WAN), such as the Internet. In turn, other devices such as processing elements (for example, personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore the mobile terminal 10 and the second and third communication devices 20 and 25 may communicate in accordance with, for example, Radio Frequency (RF), Cellular, Near Field Communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

According to some example embodiments, the first communication device (for example, the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

According to some example embodiments, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

According to some example embodiments, the mobile terminal as well as the second and third communication devices 20 and 25 may employ an apparatus (for example, apparatus of FIG. 2) capable of functioning according to example embodiments of the invention.

FIG. 2 illustrates a schematic block diagram of an apparatus for performing compression sampling of data and optimizing communications of compressed data via one or more wireless links according to some example embodiments. Some example embodiments of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, some embodiments of the invention may be embodied wholly at a single device (for example, the mobile terminal 10), by a plurality of devices in a distributed fashion (for example, on one or a plurality of devices in a P2P network) or by devices in a client/server relationship. Furthermore, it should be noted that the devices or elements described below may not be mandatory and thus some may be omitted in some embodiments.

Referring now to FIG. 2, the apparatus 50 may include or otherwise be in communication with a processor 70, a user interface 67, a communication interface 74, a memory device 76, a display 85, a camera module 36 and a wireless link manager module 78. According to some example embodiments the wireless link manager module 78, the camera module 36, the display 85, the processor 70 and the memory device 76 may communicate via bus 71 such as, for example, a Mobile Industry Processor Interface (MIPI®) Unified Protocol (MIPI® UniPro$^{SM}$) wireless link, Discobus™ wireless link or any other suitable link. In this regard, data such as, for example, compressed data may be exchanged between the wireless link manager module 78, the camera module 36, the display 85, the processor 70, the memory device 76 and/or one or more external devices (e.g., one or more device(s) 84) in one or more data packets (e.g., messages (e.g., UniPro$^{SM}$ messages)) via bus 71, as described more fully below.

According to some example embodiments, the display 85 may be a touch screen display. The display may include a graphics processing unit (GPU) 58 configured to decode, decompress and/or reconstruct data (e.g., images, video data, audio data, etc.), as described more fully below. The memory device 76 may include, for example, volatile and/or non-volatile memory. For example, the memory device 76 may be an electronic storage device (for example, a computer readable storage medium) comprising gates configured to store data (for example, bits) that may be retrievable by a machine (for example, a computing device like processor 70). In some embodiments, the memory device 76 may be a tangible memory device that is not transitory. The memory device 76 may be configured to store information (for example, compressed data, decompressed data, etc.), data, files, applications, instructions or the like for enabling the apparatus to carry out various functions in accordance with example embodiments of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (for example, pictures (e.g., images), videos, audio data, etc.). The memory device 76 may also store data received from one or more radio frequency devices (e.g., radio frequency identification (RFID) tags, near field communication (NFC) tags, etc.).

The apparatus 50 may, according to some example embodiments, be a mobile terminal (for example, mobile terminal 10) or a fixed communication device or computing device configured to employ example embodiments of the invention. According to some example embodiments, the apparatus 50 may be embodied as a chip or chip set. In other words, the apparatus 50 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. The apparatus 50 may therefore, in some cases, be configured to implement embodiments of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In some example embodiments, the processor 70 may be configured to execute instructions stored in the memory device 76 or otherwise accessible to the processor 70. As such, whether configured by hardware or software methods, or by a combination thereof, the processor 70 may represent an entity (for example, physically embodied in circuitry) capable of performing operations according to embodiments of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (for example, a mobile terminal or network device) adapted for employing embodiments of the invention by further configuration of the processor 70 by instructions for performing the algorithms and operations described herein. The processor 70 may include, among other things, a clock, an arithmetic logic unit (ALU) and logic gates configured to support operation of the processor 70.

In some example embodiments, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

The communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In some example embodiments in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (for example, software and/or firmware) stored on a memory accessible to the processor 70 (for example, memory device 76, and/or the like).

As shown in FIG. 2, the apparatus 50 may also include one or more means for sharing and/or obtaining data. For example, the apparatus may comprise a short range radio frequency (RF) transceiver and/or interrogator 64 so data may be shared with and/or obtained from electronic devices (for example, a RF access point(s)) in accordance with RF techniques. The apparatus may comprise other short range transceivers, such as, for example an infrared (IR) transceiver 66, a Bluetooth™ (BT) transceiver 68 operating using Bluetooth™ brand wireless technology developed by the Bluetooth™ Special Interest Group, and/or the like. The Bluetooth transceiver 68 may be configured to operate according to Wibree™ radio standards. The apparatus 50 may also include a WLAN transceiver 69 configured to transmit and/or receive data from electronic devices (for example, a WLAN access point(s)) according to a WLAN technique such as, for example, IEEE 802.11 techniques. In some example embodiments, the WLAN transceiver 69 may also be configured to transmit and/or receive data from electronic devices according to various wireless networking techniques, including, but not limited to, Wi-Fi, LAN techniques, and/or the like. In this regard, the apparatus 50 and, in particular, the short range transceiver may be capable of transmitting data to and/or receiving data from electronic devices (for example, a RFID tag(s), a NFC tag(s), an IR access point(s), a BT access point(s), etc.) within a proximity of the apparatus, such as within 10 meters, for example.

The apparatus 50 includes a media capturing element, such as camera module 36. The camera module 36 may include a camera, video and/or audio module, in communication with the processor 70 and the display 85. The camera module 36 may be any means for capturing an image, video and/or audio for storage, display or transmission. For example, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device (e.g., memory device 76) of the apparatus 50 stores instructions for execution by the processor 70 in the form of software necessary to create a digital image file from a captured image. In an example embodiment, the camera module 36 may further include a processing element such as a co-processor which assists the processor 70 in processing image data and an encoder and/or decoder for compressing and/or decompressing image data. The encoder and/or decoder may encode and/or decode according to a Joint Photographic Experts Group, (JPEG) standard format or another like format. In some cases, the camera module 36 may provide live image data to the display 85. In this regard, the camera module 36 may facilitate or provide a camera view to the display 85 to show live image data, still image data, video data, or any other suitable data. Moreover, in an example embodiment, the display 85 may be located on one side of the apparatus 50 and the camera module 36 may include a lens positioned on the opposite side of the apparatus 50 with respect to the display 85 to enable the camera module 36 to capture images on one side of the apparatus 50 and present a view of such images to the user positioned on the other side of the apparatus 50. In an example embodiment, the camera module 36 may provide data (e.g., one or more images, video data, etc.) to the memory 36 via bus 71 for processing by the wireless link manager module 78. In this regard, the wireless link manager module 78 may compress and enable decompression of the compressed data, as described more fully below.

In some example embodiments, the processor 70 may be embodied as, include or otherwise control the wireless link manager module 78. The wireless link manager 78 may be any means such as a device or circuitry operating in accordance with software or otherwise embodied in hardware or a combination of hardware and software (for example, processor 70 operating under software control, the processor 70 embodied as an ASIC or FPGA specifically configured to perform the operations described herein, or a combination thereof) thereby configuring the device or circuitry to perform the corresponding functions of the wireless link manager 78, as described below. Thus, in an example in which software is employed, a device or circuitry (for example, the processor 70 in one example) executing the software forms the structure associated with such means.

The wireless link manager module 78 may perform compression sampling (or sensing) of data by (for example, only) sampling relevant information required to reconstruct an original or nearly equal original item(s) of data (e.g., an image(s), video(s), audio data, etc.). In this regard, the original item(s) of data (e.g., content) may be reconstructed from a smaller amount of information than is required for a Nyquist sampling frequency or other conventional compression mechanisms.

The wireless link manager module 78 may compress data based in part generating one or more projections (e.g., related to wavelet coefficients) of an item(s) of data (e.g., an image(s)). The data may be received via bus 71 from the memory device 76. The data may include, but is not limited to, image data, video data, audio data and any other suitable data. For purposes of illustration and not of limitation, the description below may, but need not, relate to the wireless link manager module 78 compressing items of data such as, for example, one or more images, video data, etc. (e.g., a still image, one or more images in sequence forming a video(s), video clip, etc). However, it should be pointed out that the wireless link manager module 78 may compress other data (e.g., audio data, etc.) in a similar manner.

To compress an image(s) being sampled by the wireless link manager module 78, the wireless link manager module 78 may detect one or more signals of the pixels of the image(s) and may sample a portion of the data (e.g., a predetermined amount) of the image, but may not necessarily sample every pixel of the image(s). In this regard, the wireless link manager module 78 may sample enough of the data to generate a continuous signal (e.g., an analog signal) that may form a projection (e.g., associated with one or more wavelet coefficients) of the portion (e.g., corresponding pixels) of the image(s) that is sampled. In this regard, the projection may correspond to a representative compressed portion of the image being sampled, as described more fully below. The wireless link manager module 78 may perform the process of generating one or more additional projections in this manner to obtain a representative number of projections corresponding to other pixels of the image(s) until enough projections are obtained to reconstruct the original image(s).

Each of the projections generated by the wireless link manager module 78 may be sent by wireless link manager module 78 in one or more data packets (e.g., messages (e.g., UniPro$^{SM}$ messages, Discobus™ messages, etc.)) to the display 85 (and/or to one or more external display devices (e.g., display 95 of FIG. 4)). In an example embodiment, the wireless link manager module 78 may split the data associated with the total number of projections (e.g., associated with one or more wavelet coefficients) into one or more data packets. For example, for purposes of illustration and not of limitation, consider that the wireless link manager module 78 generated 1,000 projections corresponding to an image(s). In this regard, the wireless link manager module 78 may, but need not, send each of the projections in a corresponding data packet(s) to a display (e.g., display 85 or an external display (e.g., display 95 of FIG. 4)). As such, in this example, the display may receive 1,000 data packets in which each data packet may include a corresponding projection. Although in this example embodiment, the wireless link manager module 78 may include one projection (associated with one or more wavelet coefficients) in each data packet corresponding to the total number of generated projections for an image(s), it should be pointed out that the wireless link manager module 78 may include any suitable number of projections (e.g., 2, 3, 4, projections, etc.) in a data packet(s) corresponding to a sampled/compressed image(s).

In addition, in instances in which the wireless link manager module 78 may generate the data packets (e.g., messages (e.g., UniPro$^{SM}$ messages, Discobus™ messages, etc.)) for sending via the bus 71 to the display 85 or other devices, the wireless link manager module 78 may include data in each of the packets indicating a bit (e.g., a reliability flag bit (e.g., a reliability flag bit of a UniPro$^{SM}$ message (e.g., a point-to point (P2P) reliability flag bit)) that denotes that the data (e.g., one or more projections) in the respective data packet corresponds to an unreliable state/mode. The bit (e.g., reliability bit) serving to indicate/denote that the data (e.g., one or more projections) of the respective data packet is in an unreliable state/mode, may denote that the corresponding data packet(s) may not need to be resent in the event of a detection of an error (e.g., bit error of a projection(s)) within the data packet(s). In an example embodiment, in response to receipt of a corresponding data packet(s), the GPU 58 of the display 85 may determine whether there is an error in data of a projection (e.g., detect an error of a wavelet coefficient(s)) corresponding to a compressed image(s). The error(s) may, but need not, be caused by a bit error rate (BER) of the bus 71 (e.g., a UniPro$^{SM}$ wireless link, a Discobus™ wireless link, etc.).

In an example embodiment, by splitting the data corresponding to the total number of projections corresponding to an image(s) in one or more data packets, the wireless link manager module 78 may enable recovery or reconstruction of the original data of the image(s) even in instances in which up to 70% of the data of the corresponding data packets may be lost (for example, due to error). As such, each of the data packets corresponding to an image(s) may be associated with, or may include, data indicating/denoting that when a number of errors above a predetermined threshold (e.g., equal to or above 71% error detection) are detected, by the GPU 58, this detection may trigger the GPU 58 to send a message to the wireless link manager module 78 to resend the corresponding data packet(s). On the other hand, each of the data packets corresponding to an image(s) may be associated with, or may include, data indicating/denoting that when a number of errors equal to or below a predetermined threshold (e.g., equal to or below 70% error detection) are detected, by the GPU 58, may denote to the GPU 58 to continue decompress/reconstruct the data (e.g., projections) of the corresponding data packet(s) based on the data (e.g., 30% of the correct data) that does not correspond to any errors. In this regard, the data (e.g., a reliability bit) may denote that the detected errors equaling or below the predetermined threshold are insufficient to inhibit reconstruction of the image(s).

By not triggering the GPU 58 to request resending of data packets having an error equal to or below a predetermined threshold (e.g., equal to or below 70% of detected errors), the wireless link manager module 78 may enable conservation of processing and memory resources of the apparatus 50 which may enhance the operation/functionality of the apparatus 50. According to an example embodiment, even in instances in which a predetermined amount of data (e.g., projections) of the data packets are detected, by the GPU 58 to be in error, the wireless link manager module 78 may enable reconstruction/decompression of a corresponding image(s) in a high quality manner based in part on utilizing the data without the errors (e.g., 30% of the data having no errors.).

Referring now to FIG. 3, a schematic block diagram of a display is provided according to an example embodiment. The display 45 (e.g., display 85) may include a graphical processing unit (GPU) 48 (e.g., GPU 58) including a processor 50 and a memory 56. The memory 56 may comprise volatile and/or non-volatile memory, and may store content, data and/or the like. For example, the memory 56 may store data such as, for example, one or more data packets (e.g., messages (e.g., UniPro$^{SM}$ messages, Discobus™ messages, etc.)) received via bus 71 from one or more devices such as, for example, the wireless link manager module 78, the processor 70, etc. The data packets may include a projection(s) with a respective reliability bit indicating or denoting that the data of the data packets may be in an unreliable state/mode.

The processor 50 may be connected to the memory 56 and may comprise user interface circuitry configured to control at least some functions of one or more elements of a user input interface. The processor 50 and/or user interface circuitry of the processor 56 may be configured to control one or more functions of one or more elements of the user input interface through computer program instructions (e.g., software and/or firmware) stored on a memory (e.g., memory 56) accessible to the processor (e.g., volatile memory, non-volatile memory, and/or the like).

In an example embodiment, the processor 50 may be any means such as a device or circuitry operating in accordance with software or otherwise embodied in hardware or a combination of hardware and software (for example, processor 70 operating under software control, the processor 50 embodied as an ASIC or FPGA specifically configured to perform the operations described herein, or a combination thereof) thereby configuring the device or circuitry to perform the corresponding functions of the GPU 48, as described herein. Thus, in an example in which software is employed, a device or circuitry (for example, the processor 70 in one example) executing the software forms the structure associated with such means.

The processor 50 may decompress and/or reconstruct an original image(s) corresponding to the compressed samples associated with the projections (e.g., related to wavelet coefficients) generated by the wireless link manager module 78. In an example embodiment, the processor 50 may decompress and/or reconstruct an original image(s) by detecting one or more wavelet coefficients of corresponding projections that may be selected by the processor 50 which relate to a smallest total variation, for example, a best match to the original signal at the corresponding point(s) (e.g., a pixel(s)) in which an original signal (e.g., an analog signal) was sampled by the wireless link manager module 78, as described more fully below.

Referring now to FIG. 4, a block diagram of one example of a device is provided. According to some example embodiments, the device 90 (e.g., device(s) 84, a network device, etc.) may be a standalone device. In some other example embodiments, the device 90 may be a headset, a television, etc. As shown in FIG. 4, the device 90 (for example, a server) generally includes a processor 94 and an associated memory 96. The memory 96 may comprise volatile and/or non-volatile memory, and may store content, data and/or the like. For example, the memory may store content, data, information, and/or the like transmitted from, and/or received by, the device. Also for example, the memory 96 may store client applications, instructions, and/or the like for the processor 94 to perform the various operations of the network device in accordance with example embodiments of the invention, as described herein. The memory 96 may also store one or more projections of data received, in one or more data packets via the bus 71 from the wireless link manager module 78 and/or memory device 76. The projections may be associated with one or more corresponding compressed images.

In addition to the memory 96, the processor 94 may also be connected to at least one interface or other means for displaying, transmitting and/or receiving data, content, and/or the like. In this regard, the interface(s) may comprise at least one communication interface 98 or other means for transmitting and/or receiving data, content, and/or the like, via bus 71 for example, as well as at least one optional user input interface 95. The user input interface 95, in turn, may comprise any of a number of devices allowing the device 90 to receive data from a user, such as a keypad, a touch display, a joystick or other input device. In this regard, the processor 94 may comprise user interface circuitry configured to control at least some functions of one or more elements of the user input interface. The processor and/or user interface circuitry of the processor may be configured to control one or more functions of one or more elements of the user interface through computer program instructions (for example, software and/or firmware) stored on a memory accessible to the processor (for example, volatile memory, non-volatile memory, and/or the like).

In some example embodiments, the processor 94 may be embodied as, include or otherwise control the GPU 91 (e.g., GPU 48) of the display 95. This display 95 may be a touch display in one example embodiment. The GPU 91 of the display 95 may decompress or reconstruct data received in one or more data packets via a bus 71 from the apparatus 50 for example. In an example embodiment, the GPU 91 may decompress and/or reconstruct one or more corresponding images in the manner analogous to that described above with respect to the GPU 48.

As another example in which the wireless link manager module 78 may compress sampled data (e.g., lossy compression) and may facilitate decompression of the compressed data utilizing compressed sensing, consider an instance in which the wireless link manager module 78 detects an N-dimensional signal (e.g., 2,000×1,000) associated with a 3×8 bit photo (e.g., an image). In this regard, the wireless link manager module 78 may determine that the 3×8 bit photo may have $N=6\times 10^6$ 8 bit vectors that may be projected into M-dimensional wavelet domains, where M<N. For example, M may equal 20,000 (e.g., M=20,000). As such, the wireless link manager module 78 may measure K=4M=80,000 (e.g., 4×20,000=80,000) wavelet coefficients. It should be pointed out that K may equal 4M, since in one example embodiment about four incoherent samples per unknown nonzero terms may be needed for recovery. By utilizing wavelet coefficients where M<N corresponding to a respective projection(s) of an image(s) according to an example embodiment, instead of utilizing $6\times 10^6$ (e.g., 6 million) 8 bit analog to digital conversion samples as may be typically required or utilized in traditional/conventional sampling, the exemplary embodiments may conserve computing, processing and memory resources since less data (for example since M<N) may be sampled and less data may be needed for reconstruction of an image(s) (e.g., the 3×8 bit photo).

The wireless link manager module 78 may store the compressed samples associated with the wavelet coefficients in a memory (e.g., memory device 76). The corresponding wavelet coefficients may be associated with respective projections which may be included in one or more respective data packets (e.g., messages (e.g., UniPro$^{SM}$ messages, Discobus™ messages, etc.)) by the wireless link manager module 78 and may be sent to a display (e.g., display 85, display 95) via bus 71. The data packets may include data indicating/denoting that a reliability bit is set to an unreliable state/mode. The compressed samples relating to the corresponding wavelet coefficients may be stored in the memory and may be utilized to reconstruct/decompress the original photo (e.g., the 3×8 bit photo (e.g., an image). In this regard, a GPU (e.g., GPU 58 (or GPU 91) of a display (e.g., display 85 (or display 95) may utilize the wavelength coefficients associated with compressed sampled data to reconstruct/decompress the compressed image (e.g., the compressed 3×8 bit photo).

For example, an original image (e.g., the 3×8 bit photo) may be reconstructed/decompressed by a GPU (e.g., GPU 58, GPU 91) of a display (e.g., display 85, display 95) accessing data of the memory (e.g., memory device 76, memory 96) and determining corresponding wavelet coefficients that are selected to provide a smallest total variation, for example, a best match to an original signal at the corresponding point(s) (e.g., corresponding pixels) that the original signal was sampled. A GPU (e.g., GPU 58, GPU 91) of a corresponding display (e.g., display 85, display 95) may access the wavelet coefficients via the bus 71.

In an alternative example embodiment, the wireless link manager module 78 may add or include the corresponding reliability flag bit into a connection setup packet instead of a data packet(s) including the wavelet coefficients corresponding to a respective projection(s). In this regard, the reliability flag bit may be directly connected to the initialization of the compressed sampling mechanism. As such, each time the connection setup packet is activated, the wireless link module manager 78 may enable the bus 71 (e.g., wireless link) associated with a device (e.g., camera module 36, display 95, etc.) to automatically switch to the unreliable state/mode of operation. In this manner, the wireless link manager module 78 may enable a decrease in energy consumption, bandwidth overhead, etc. while providing high quality content (e.g., a high quality reconstructed image).

Referring now to FIG. 5, an example flowchart for compressing data and optimizing transfer of the compressed data via one or more wireless links according to an example embodiment is provided. At operation 500, an apparatus (e.g., wireless link manager module 78) may compress one or more samples of data corresponding to at least one image (e.g., a digital image, image(s) of a video, etc.) based in part on generating a plurality of wavelet coefficients corresponding to the sampled data.

At operation 505, an apparatus (e.g., wireless link manager module 78) may generate one or more messages (e.g., UniPro$^{SM}$ messages, Discobus™ messages, etc.) including at least one of the wavelet coefficients. Each of the messages may include content (e.g., a reliability bit (e.g., a UniPro$^{SM}$ reliability flag bit)) denoting/indicating that one or more detected errors below a predetermined threshold (e.g., equal to or below 70% error detection associated with the wavelet coefficients) are insufficient to inhibit reconstruction of the image. The apparatus (e.g., wireless link manager module 78) may include at least one of the wavelet coefficients in each of the messages to obtain a total number of messages that aggregately includes all of the wavelet coefficients. In this regard, the wavelet coefficients may be split into multiple messages for transmission. At operation 510, an apparatus (e.g., wireless link manager module 78) may enable transmission of the messages to a device (e.g., a display device (e.g., display 85, display 95, etc.)) via at least one wireless link (e.g., a UniPro$^{SM}$ wireless link, a Discobus™ wireless link, etc.).

It should be pointed out that FIG. 5 is a flowchart of a system, method and computer program product according to some example embodiments of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in some example embodiments, the computer program instructions which embody the procedures described above are stored by a memory device (for example, memory device 76, memory 56, memory 96) and executed by a processor (for example, processor 70, processor 50, processor 94, wireless link manager module 78). As will be appreciated, any such computer program instructions may be loaded onto a computer or other programmable apparatus (for example, hardware) to produce a machine, such that the instructions which execute on the computer or other programmable apparatus cause the functions specified in the flowchart blocks to be implemented. In some example embodiments, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some example embodiments, an apparatus for performing the method of FIG. 5 above may comprise a processor (for example, the processor 70, the processor 50, processor 94, the wireless link manager module 78) configured to perform some or each of the operations (500-510) described above. The processor may, for example, be configured to perform the operations (500-510) by performing hardware implemented logical functions, executing stored instructions, or executing algorithms for performing each of the operations. Alternatively, the apparatus may comprise means for performing each of the operations described above. In this regard, according to some example embodiments, examples of means for performing operations (500-510) may comprise, for example, the processor 70 (for example, as means for performing any of the operations described above), the processor 50, the processor 94, the wireless link manager module 78 and/or a device or circuitry for executing instructions or executing an algorithm for processing information, as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    compressing one or more samples of data corresponding to at least one image based in part on generating a plurality of wavelet coefficients corresponding to the sampled data;
    generating, via a processor, one or more messages comprising at least one of the wavelet coefficients, each of the messages comprising content denoting that one or more detected errors below a predetermined threshold are insufficient to inhibit reconstruction of the image; and
    enabling transmission of the messages to at least one device via at least one wireless link.

2. The method of claim 1, wherein generating comprises including at least one of the wavelet coefficients in each of the messages to obtain a total number of messages that aggregately comprises the plurality of wavelet coefficients.

3. The method of claim 1, wherein the wireless link comprises at least one of a Unified Protocol wireless link or a Discobus wireless link.

4. The method of claim 1, wherein the content comprises a reliability bit comprising a value.

5. The method of claim 3, further comprising:
    utilizing the reliability bit to enable switching of a mode of the wireless link from a reliable state to an unreliable state in which data of the image is reconstructed even though an error associated with at least one of the wavelet coefficients is detected.

6. The method of claim 5, further comprising:
    continuing to reconstruct a corresponding portion of the image in response to detecting one or more errors below a predetermined threshold based in part on information of the sampled data that is not associated with an error.

7. The method of claim 5, further comprising:
    generating a message requesting that one or more corresponding wavelet coefficients are retransmitted to the device, in response to detecting one or more errors associated with the corresponding wavelet coefficients above the predetermined threshold.

8. The method of claim 1, wherein the messages comprise one or more Unified Protocol messages.

9. The method of claim 1, further comprising:
    enabling decompression of the compressed samples based in part on analyzing one or more respective wavelet coefficients by accessing data associated with the respective wavelet coefficients via the wireless link.

10. An apparatus comprising:
    at least one processor; and
    at least one memory including computer program code configured to, with the at least one processor, cause the apparatus to perform at least the following:
        compress one or more samples of data corresponding to at least one image based in part on generating a plurality of wavelet coefficients corresponding to the sampled data;
        generate one or more messages comprising at least one of the wavelet coefficients, each of the messages comprising content denoting that one or more detected errors below a predetermined threshold are insufficient to inhibit reconstruction of the image; and
        enable transmission of the messages to at least one device via at least one wireless link.

11. The apparatus of claim 10, wherein the memory and computer program code are configured to, with the processor, cause the apparatus to:
    generate the messages by including at least one of the wavelet coefficients in each of the messages to obtain a total number of messages that aggregately comprises the plurality of wavelet coefficients.

12. The apparatus of claim 10, wherein the wireless link comprises at least one of a Unified Protocol wireless link or a Discobus wireless link.

13. The apparatus of claim 10, wherein the content comprises a reliability bit comprising a value.

14. The apparatus of claim 12, wherein the memory and computer program code are configured to, with the processor, cause the apparatus to:
    utilize the reliability bit to enable switching of a mode of the wireless link from a reliable state to an unreliable state in which data of the image is reconstructed even though an error associated with at least one of the wavelet coefficients is detected.

15. The apparatus of claim 14, wherein the memory and computer program code are configured to, with the processor, cause the apparatus to:

continue to reconstruct a corresponding portion of the image in response to detecting one or more errors below a predetermined threshold based in part on information of the sampled data that is not associated with an error.

16. The apparatus of claim 14, wherein the memory and computer program code are configured to, with the processor, cause the apparatus to:

generate a message requesting that one or more corresponding wavelet coefficients are retransmitted to the device, in response to detecting one or more errors associated with the corresponding wavelet coefficients above the predetermined threshold.

17. The apparatus of claim 10, wherein the messages comprise one or more Unified Protocol messages.

18. The apparatus of claim 10, wherein the memory and computer program code are configured to, with the processor, cause the apparatus to:

enable decompression of the compressed samples based in part on analyzing one or more respective wavelet coefficients by accessing data associated with the respective wavelet coefficients via the wireless link.

19. A computer program product comprising at least one non-transitory computer-readable storage medium having computer-readable program code portions stored therein, the computer-readable program code portions comprising:

program code instructions configured to compress one or more samples of data corresponding to at least one image based in part on generating a plurality of wavelet coefficients corresponding to the sampled data;

program code instructions configured to generate one or more messages comprising at least one of the wavelet coefficients, each of the messages comprising content denoting that one or more detected errors below a predetermined threshold are insufficient to inhibit reconstruction of the image; and program code instructions configured to enable transmission of the messages to at least one device via at least one wireless link.

20. The computer program product of claim 19, further comprising:

program code instructions configured to generate the messages by including at least one of the wavelet coefficients in each of the messages to obtain a total number of messages that aggregately comprises the plurality of wavelet coefficients.

* * * * *